United States Patent
Abe et al.

(10) Patent No.: US 11,635,653 B2
(45) Date of Patent: Apr. 25, 2023

(54) LIQUID CRYSTAL DISPLAY DEVICE, POLARIZER AND PROTECTIVE FILM

(71) Applicant: TOYOBO CO., LTD., Osaka (JP)

(72) Inventors: Takahisa Abe, Tsuruga (JP); Toshiki Inoue, Tsuruga (JP); Kouichi Murata, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/281,723

(22) PCT Filed: Sep. 27, 2019

(86) PCT No.: PCT/JP2019/038241
§ 371 (c)(1),
(2) Date: Mar. 31, 2021

(87) PCT Pub. No.: WO2020/071282
PCT Pub. Date: Apr. 9, 2020

(65) Prior Publication Data
US 2021/0389626 A1    Dec. 16, 2021

(30) Foreign Application Priority Data
Oct. 2, 2018 (JP) .............................. JP2018-187327

(51) Int. Cl.
*G02F 1/1335* (2006.01)
*G02B 1/14* (2015.01)
(Continued)

(52) U.S. Cl.
CPC ........ *G02F 1/133528* (2013.01); *C08L 67/02* (2013.01); *G02B 1/14* (2015.01); *C08L 2203/16* (2013.01); *G02F 1/133609* (2013.01)

(58) Field of Classification Search
CPC .. G02B 1/14; G02B 5/30; G02B 5/3033–305; G02F 1/133528–13355; G02F 1/133609
See application file for complete search history.

(56) References Cited

U.S. PATENT DOCUMENTS

2006/0257693 A1   11/2006 Meguro et al.
2008/0131704 A1    6/2008 Mizuno et al.
(Continued)

FOREIGN PATENT DOCUMENTS

CN    101045347 A    10/2007
CN    103118853 A     5/2013
(Continued)

OTHER PUBLICATIONS

Japanese Patent Office, International Search Report in International Patent Application No. PCT/JP2019/038241 (dated Dec. 10, 2019).
(Continued)

*Primary Examiner* — Mariceli Santiago
(74) *Attorney, Agent, or Firm* — Leydig, Voit & Mayer, Ltd.

(57) ABSTRACT

The invention provides a liquid crystal display device, a polarizer, and a protective film that enable suppression of the occurrence of rainbow unevenness to improve visibility in a liquid crystal display device including a backlight light source comprising white-light-emitting diode having an emission spectrum that has one or more peak tops in each of the blue region (400 nm or more and less than 495 nm), the green region (495 nm or more and less than 600 nm), and the red region (600 nm or more and 780 nm or less). The protective film contains a polyethylene terephthalate-based resin film that has a retardation of 3000 to 30000 nm, wherein the CTF value of periodic unevenness of the x value of chromaticity at an observation angle of 55 degrees is 1.2 or less.

3 Claims, 1 Drawing Sheet

(51) Int. Cl.
    *C08L 67/02*     (2006.01)
    *G02F 1/13357*     (2006.01)

(56) References Cited

U.S. PATENT DOCUMENTS

| | | | |
|---|---|---|---|
| 2013/0100378 A1 | 4/2013 | Murata et al. | |
| 2013/0162930 A1 | 6/2013 | Shin et al. | |
| 2013/0172515 A1 | 7/2013 | Horie et al. | |
| 2015/0131043 A1 | 5/2015 | Yamamoto et al. | |
| 2015/0331282 A1* | 11/2015 | Yamada | G02F 1/13363 349/69 |
| 2019/0204677 A1 | 7/2019 | Kim et al. | |
| 2020/0050039 A1 | 2/2020 | Koike et al. | |

FOREIGN PATENT DOCUMENTS

| | | |
|---|---|---|
| JP | 2002-116320 A | 4/2002 |
| JP | 2004-205773 A | 7/2004 |
| JP | 2004-219620 A | 8/2004 |
| JP | 3567927 B2 | 9/2004 |
| JP | 3589232 B2 | 11/2004 |
| JP | 3589233 B2 | 11/2004 |
| JP | 2006-318550 A | 11/2006 |
| JP | 3900191 B2 | 4/2007 |
| JP | 4150982 B2 | 9/2008 |
| JP | 2011-053271 A | 3/2011 |
| JP | 2015-111207 A | 6/2015 |
| JP | 2015-215577 A | 12/2015 |
| JP | 2017-043756 A | 3/2017 |
| JP | 2017-102289 A | 6/2017 |
| JP | 2017-167330 A | 9/2017 |
| JP | 2017-167331 A | 9/2017 |
| JP | 2018-028611 A | 2/2018 |
| JP | 2018-028612 A | 2/2018 |
| JP | 2019-079053 A | 5/2019 |
| KR | 10-2013-0074665 A | 7/2013 |
| KR | 2013-0117765 A | 10/2013 |
| KR | 2015-0041791 A | 4/2015 |
| KR | 10-2018-0048171 A | 5/2018 |
| WO | WO 2011/162198 A1 | 12/2011 |
| WO | WO 2012/043281 A1 | 4/2012 |
| WO | WO 2016/147767 A1 | 9/2016 |
| WO | WO 2017/010444 A1 | 1/2017 |
| WO | WO 2017/065148 A1 | 4/2017 |
| WO | WO 2017/094553 A1 | 6/2017 |
| WO | WO 2017/119427 A1 | 7/2017 |
| WO | WO-2017209473 A1 * | 12/2017 ............ B29C 55/06 |
| WO | WO 2018/043891 A1 | 3/2018 |
| WO | WO 2018/110625 A1 | 6/2018 |
| WO | WO 2018/159568 A1 | 9/2018 |
| WO | WO 2018/159569 A1 | 9/2018 |
| WO | WO 2018/181653 A1 | 10/2018 |
| WO | WO 2018/181655 A1 | 10/2018 |

OTHER PUBLICATIONS

China National Intellectual Property Administration, First Office Action in Chinese Patent Application No. 201880019761.8 (dated Jan. 7, 2021).
Japan Patent Office, International Search Report in International Patent Application No. PCT/JP2018/013103 (dated Jul. 3, 2018).
Japan Patent Office, Notice of Reasons for Refusal in Japanese Patent Application No. 2019-510094 (dated Nov. 30, 2021).
Japan Patent Office, Notice of Reasons for Refusal in Japanese Patent Application No. 2019-510094 (dated Mar. 29, 2022).

* cited by examiner

LIQUID CRYSTAL DISPLAY DEVICE, POLARIZER AND PROTECTIVE FILM

CROSS-REFERENCE TO RELATED APPLICATIONS

This patent application is the U.S. national phase of International Patent Application No. PCT/JP2019/038241, filed Sep. 27, 2019, which claims the benefit of Japanese Patent Application No. 2018-187327, filed Oct. 2, 2018, which are incorporated by reference in their entireties herein.

TECHNICAL FIELD

The present invention relates to a liquid crystal display device, a polarizer, and a protective film.

BACKGROUND ART

Polarizers used in liquid crystal display devices (LCDs) generally have a structure in which a polarizing film obtained by dyeing polyvinyl alcohol (PVA) etc. with iodine is sandwiched between two protective films. Triacetyl cellulose (TAC) films are commonly used as the protective films. Along with the recent trend of thinner LCDs, there is a demand for reducing the thickness of polarizers. However, when the thickness of TAC films used as protective films is reduced in order to satisfy this demand, problems such as insufficient mechanical strength and deteriorated moisture permeability occur. Moreover, TAC films are very expensive, and polyester films have been proposed as inexpensive alternative materials (Patent Literature 1 to Patent Literature 3), but have the problem that rainbow unevenness is observed.

When an oriented polyester film with birefringent properties is disposed on one side of a polarizing film, the state of linearly polarized light emitted from a backlight unit or polarizing film changes when the light passes through the polyester film. The transmitted light shows an interference color specific to the retardation of the oriented polyester film, which is the product of the birefringence and the thickness of the film. Accordingly, when cold-cathode tubes, hot-cathode tubes, or the like that have a discontinuous emission spectrum are used as a light source, the intensity of the transmitted light varies depending on the wavelength, causing rainbow unevenness.

As means for solving the above problems, it has been proposed to use a white light source having a continuous and wide emission spectrum, such as a white-light-emitting diode, as a backlight light source and further to use an oriented polyester film having a specific retardation as a protective film (Patent Literature 4). White-light-emitting diodes have a continuous and wide emission spectrum in the visible light region. Therefore, when focusing on the envelope curve shape of the interference color spectrum of light transmitted through a birefringent material, a spectrum similar to the emission spectrum of the light source can be obtained by controlling the retardation of the oriented polyester film, thereby suppressing rainbow unevenness.

CITATION LIST

Patent Literature

PTL 1: JP2002-116320A
PTL 2: JP2004-219620A
PTL 3: JP2004-205773A
PTL 4: WO2011/162198

SUMMARY OF INVENTION

Technical Problem

White-light-emitting diodes (white LEDs) with light-emitting devices obtained by the combined use of yttrium-aluminum-garnet yellow phosphors (YAG-based yellow phosphors) with blue-light-emitting diodes have been widely used as a backlight light source in liquid crystal display devices. Since such a white light source has a wide emission spectrum in the visible light region and excellent luminous efficiency, it is widely used as a backlight light source. However, liquid crystal display devices using white LEDs as a backlight light source can reproduce only about 20% of the spectrum of colors recognizable by the human eye.

Due to recent increasing demand for expanding the color gamut, liquid crystal display devices have been developed using a backlight light source comprising a white-light-emitting diode (e.g., a white-light-emitting diode comprising a blue-light-emitting diode and at least a fluoride phosphor such as $K_2SiF_6:Mn^{4+}$ as a phosphor) having an emission spectrum that has one or more peak tops in each of the following wavelength regions: the blue region (400 nm or more and less than 495 nm), the green region (495 nm or more and less than 600 nm), and the red region (600 nm or more and 780 nm or less) and in which the half widths of the peaks in the red region (600 nm or more and 780 nm or less) are relatively narrow (the half width of the most intense peak being, for example, less than 5 nm). Such liquid crystal display devices, which achieve a wide color gamut, are said to be able to reproduce 60% or more of the spectrum of colors recognizable by the human eye.

It was newly found that the above white light source, which achieves a wide color gamut, has a narrower peak half width than conventional light sources comprising white-light-emitting diodes containing a YAG-based yellow phosphor and that rainbow unevenness may occur when a polyethylene terephthalate-based resin film having retardation is used as a protective film, which is a component of a polarizer.

Specifically, an object of the present invention is to provide a liquid crystal display device, a polarizer, and a protective film that enable suppression of the occurrence of rainbow unevenness to improve visibility even when a polyethylene terephthalate-based resin film is used as a protective film, which is a component of a polarizer, in a liquid crystal display device including a backlight light source comprising a white-light-emitting diode having an emission spectrum that has one or more peak tops in each of the following wavelength regions: the blue region (400 nm or more and less than 495 nm), the green region (495 nm or more and less than 600 nm), and the red region (600 nm or more and 780 nm or less) and in which the half widths of the peaks in the red region (600 nm or more and 780 nm or less) are relatively narrow (the half width of the most intense peak being, for example, less than 5 nm).

Solution to Problem

The present inventors conducted extensive research and found that a smaller CTF value of periodic unevenness of the x value of chromaticity, in addition to a specific range of retardation of a polyethylene terephthalate-based resin film, is effective in suppressing rainbow unevenness.

Representative aspects of the present invention are as described below.

Item 1.

A protective film comprising a polyethylene terephthalate-based resin film, the polyethylene terephthalate-based resin film satisfying the following (1) and (2):
(1) the polyethylene terephthalate-based resin film has a retardation of 3000 to 30000 nm; and
(2) a CTF value of periodic unevenness of an x value of chromaticity at an observation angle of 55 degrees is 1.2 or less when the polyethylene terephthalate-based resin film is bonded to the light source side of a light-source-side protective film of a light-source-side polarizer in a liquid crystal display device comprising as a backlight light source a white-light-emitting diode that has one or more peak tops in an emission spectrum in each of wavelength regions of 400 nm or more and less than 495 nm, 495 nm or more and less than 600 nm, and 600 nm or more and 780 nm or less and comprises $K_2SiF_6:Mn^{4+}$ as a phosphor.

Item 2.

A polarizer comprising a polarizing film and the protective film according to Item 1 laminated on at least one surface of the polarizing film.

Item 3.

A liquid crystal display device comprising a backlight light source, two polarizers, and a liquid crystal cell disposed between the two polarizers, at least one of the two polarizers being the polarizer according to Item 2.

Advantageous Effects of Invention

According to the present invention, a liquid crystal display device, a polarizer, and a protective film can be provided in which the occurrence of rainbow unevenness can be suppressed to improve visibility even when a polyethylene terephthalate-based resin film is used as a protective film, which is a component of a polarizer, in a liquid crystal display device including a backlight light source comprising a white-light-emitting diode having an emission spectrum that has one or more peak tops in each of the following wavelength regions: the blue region (400 nm or more and less than 495 nm), the green region (495 nm or more and less than 600 nm), and the red region (600 nm or more and 780 nm or less) and in which the half widths of the peaks in the red region (600 nm or more and 780 nm or less) are relatively narrow (the half width of the most intense peak being, for example, less than 5 nm).

DESCRIPTION OF EMBODIMENTS

1. Protective Film

The polyethylene terephthalate-based resin film used for the protective film of the present invention preferably has a retardation of 3000 nm or more and 30000 nm or less. If a polyethylene terephthalate-based resin film having a retardation of less than 3000 nm is used as the protective film, an intense interference color is exhibited when observed from an oblique direction; therefore, excellent visibility cannot be ensured. The lower limit of the retardation is preferably 4000 nm, and more preferably 5000 nm.

The upper limit of the retardation is preferably 30000 nm. Even if a polyethylene terephthalate-based resin film having a retardation of higher than 30000 nm is used, the effect of further improving visibility cannot be substantially attained, and the thickness of the film considerably increases, which reduces the handling of the film as an industrial material. The upper limit is preferably 10000 nm, more preferably 9000 nm, and even more preferably 8000 nm.

The refractive index difference (refractive index in slow axis direction—refractive index in fast axis direction) in the film plane is preferably 0.08 or more. When the film is strongly stretched in one direction, and the refractive index difference in the film plane is larger, sufficient retardation can be obtained even in a thinner film, which is preferable in terms of making the film thinner. The refractive index difference in the film plane is thus more preferably 0.09 or more, and even more preferably 0.10 or more. However, if the refractive index difference in the film plane is too large, the mechanical properties of the film become significantly anisotropic. This causes the film to, for example, tear or break, which significantly reduces the practicality of the film as an industrial material. Thus, the upper limit of the refractive index difference is preferably 0.15 or less.

The retardation of the present invention can be determined by measuring refractive indices in the two axis directions in the film plane and the thickness of the film, or can also be determined using a commercially available automatic birefringence analyzer, such as a KOBRA-21ADH (Oji Scientific Instruments). The refractive indices are measured at a measurement wavelength of 589 nm.

In order to suppress rainbow unevenness observed from an oblique direction, it is preferable that the polyethylene terephthalate-based resin film used for the protective film of the present invention has a retardation in the specific range and that the CTF value of periodic unevenness of the x value of chromaticity at an observation angle of 55 degrees is 1.2 or less when the polyethylene terephthalate-based resin film is bonded to the light source side of a light-source-side protective film of a light-source-side polarizer in a liquid crystal display device comprising as a backlight light source a white-light-emitting diode that has one or more peak tops in an emission spectrum in each of the wavelength regions of 400 nm or more and less than 495 nm, 495 nm or more and less than 600 nm, and 600 nm or more and 780 nm or less and comprises $K_2SiF_6:Mn^{4+}$ as a phosphor. The CTF value is preferably 1.2 or less, more preferably 1.1 or less, even more preferably 1.0 or less, and still even more preferably 0.9 or less. In order to reduce the CTF value, it is necessary to increase the uniaxial orientation of the polyethylene terephthalate-based film; however, excessively high uniaxial orientation is not preferred because the film is prone to tearing. Thus, the lower limit is preferably 0.1. The CTF value is expressed by equation (1).

$$\text{CTF value}(\Sigma(|X_k - X_{k+1}|/|X_k + X_{k+1}|)/N) \times 100 \quad (1)$$

$X_k$ and $X_{k+1}$: x values of chromaticity at extrema (local maximum and local minimum) that appear kth and k+1th in periodic unevenness of the x value of chromaticity N: the total number of extrema (local maximums and local minimums) that appear in the analysis region The interference color produced by a birefringent material changes depending on the retardation value of the birefringent material. It is known that in a region in which the retardation is low, various colors are developed depending on the retardation value, whereas in a region in which the retardation is equal to or greater than a specific value, only magenta and cyan colors are alternately developed periodically even if the retardation changes (e.g., Michel-Levy interference color chart). As a result of the inventors' extensive research, it was found that the degree of the periodic interference color variation can be measured quantitatively as the CTF value of periodic unevenness of the x value of chromaticity in the CIE 1931 xy chromaticity diagram and that the smaller the CTF value of periodic unevenness of the x value of chromaticity in the polyethylene terephthalate-based film, the more effectively the occurrence of rainbow unevenness can be suppressed even when the polyethylene terephthalate-based film is used as a protective film. The CTF value of periodic unevenness of the x value of chromaticity can be measured using an imaging color luminance meter (produced by Radiant, a device in which a Conoscope PM-CO-060 is connected to a ProMetric IC-PMI16). The area to be measured is a circular area with a diameter of about 3 mm. In order to suppress the effect of flare light from the surrounding area on the measurement, it is preferable that the polyethylene terephthalate-based film used for the measurement has a rectangular shape with a length of one side of at least 1 cm or more or a circular shape with a diameter of at least 1 cm or more. The polyethylene terephthalate-based film used for the measurement more preferably has a rectangular shape with a length of one side of 2 cm or more, or a circular shape with a diameter of 2 cm or more. At the time of measurement, it is necessary to bond the polyethylene terephthalate-based film so that the fast axis direction of the film coincides with the absorption axis direction of the light-source-side polarizer. When the region where the polyethylene terephthalate-based film is bonded and the other regions are visually equivalent in brightness, it can be determined that the bonding direction is appropriate. It is preferable that the polyethylene terephthalate-based film used for the measurement has a rectangular shape whose longitudinal direction is the fast axis direction and that the screen size of the liquid crystal display device is equal to or greater than twice the area of the polyethylene terephthalate-based film because it can be easily determined whether the film is bonded appropriately. Moreover, it is preferable that the polyethylene terephthalate-based film and the light-source-side polarizer are bonded to each other with a substance having substantially no birefringent properties. Specifically, it is preferable to use an optically clear adhesive (OCA) or water, and it is particularly preferable to use water. Further, ethylene glycol or the like may be used instead of water, or a mixture of water and ethylene glycol may be used. In order to measure only periodic unevenness of the x value of chromaticity due to the polyethylene terephthalate-based film, the liquid crystal display device used for the measurement should be such that when the measurement is performed using only the liquid crystal display device without the polyethylene terephthalate-based film being bonded to the light source side of the light-source-side protective film, substantially no periodic unevenness of the x value of chromaticity is observed; i.e., the total number of extrema (local maximums and local minimums) in periodic unevenness of the x value of chromaticity observed in the measurement area is one or less. From the above viewpoint, it is preferable that the viewing-side protective film of the viewing-side polarizer and the light-source-side protective film of the light-source-side polarizer in the liquid crystal display device used for the measurement have substantially no birefringent properties. Specifically, it is preferable that the viewing-side protective film of the viewing-side polarizer and the light-source-side protective film of the light-source-side polarizer in the liquid crystal display device used for the measurement have a retardation of 50 nm or less. More specifically, it is preferable that the viewing-side protective film of the viewing-side polarizer and the light-source-side protective film of the light-source-side polarizer in the liquid crystal display device used for the measurement are each a triacetyl cellulose film or an acrylic film. Moreover, in order to make periodic unevenness of the x value of chromaticity due to the polyethylene terephthalate-based film apparent to facilitate the measurement, the liquid crystal display device used for the measurement includes a reflective polarizer (e.g., DBEF series produced by 3M) between the light-source-side protective film of the light-source-side polarizer and the backlight light source. In this case, the reflective polarizer is disposed so that the absorption axis of the reflective polarizer is parallel to the absorption axis of the polarizing film of the light-source-side polarizer. The details of the measurement method are described later in the Examples.

The polyethylene terephthalate-based resin film used for the protective film of the present invention preferably has a rigid amorphous fraction of 33 wt % or more in order to reduce the CTF value of periodic unevenness of the x value of chromaticity and suppress rainbow unevenness observed from an oblique direction. The polyethylene terephthalate-based resin film preferably has a rigid amorphous fraction of 33 wt % or more, more preferably 34 wt % or more, even more preferably 35 wt % or more, and still even more preferably 36 wt % or more. The upper limit is preferably 60 wt %; however, it is also sufficient that the upper limit is about 50 wt % or 45 wt %. The rigid amorphous fraction is expressed by the following equation (2).

$$\text{Rigid amorphous fraction(wt \%)} = 100 - (\text{mobile amorphous fraction(wt \%)}) - (\text{mass fraction crystallinity(wt)}) \qquad (2)$$

In the present specification, wt % is synonymous with mass %.

Conventionally, the higher-order structure of polymers has been considered to be divided into a crystalline region and an amorphous region. However, in recent year, it has been reported that the amorphous region can be further divided by the temperature dependence of the molecular motion and that the amorphous region can be divided into a mobile amorphous region in which the molecular motion is released at the glass transition point (Tg) and a rigid amorphous region in which the molecular motion is frozen even at a temperature that is equal to or higher than Tg. In the case of polyethylene terephthalate, the rigid amorphous region is known to remain amorphous up to a temperature near 200° C. Thus, it is believed that the larger the rigid amorphous fraction, the less likely the crystallization is to progress when the film is stretched or heat-treated. When the thickness and the retardation are the same in polyethylene terephthalate-based resin films, the more randomly the benzene rings are oriented around the molecular chain axis, the more rainbow unevenness observed from an oblique direction is suppressed when such a film is used as a protective film. In polyethylene terephthalate-based resin films, it is also known that benzene rings are oriented parallel to the film surface with crystallization. In polyethylene terephthalate-based resin films formed by known methods, when the refractive index difference in the film plane is increased, the degree of orientation of benzene rings with respect to the film surface may also be increased, and a sufficient rainbow unevenness suppressing effect may not be attained. As a result of research, the present inventors found that even when the refractive index difference in the film plane is increased, the orientation of benzene rings with crystallization can be effectively suppressed by controlling the rigid amorphous fraction within the above range, thus inhibiting rainbow unevenness observed from an oblique direction.

In equation (2) above, the rigid amorphous fraction is determined indirectly by using the values of the mobile amorphous fraction and the mass fraction crystallinity. The mobile amorphous fraction is determined from the reversing heat capacity difference ΔCp at Tg of a reversing heat capacity curve obtained by temperature-modulated DSC measurement using a differential scanning calorimeter (Q100 produced by TA Instruments). The mass fraction crystallinity is calculated from the density value obtained using a density gradient tube according to JIS K7112. The details are described later in the Examples.

The polyethylene terephthalate-based resin film, which is used as the protective film of the present invention, can be produced based on a general production method for polyester films. For example, non-oriented polyethylene terephthalate-based resin obtained by melting a polyethylene terephthalate-based resin and extruding the molten resin into a sheet-like shape is stretched in a longitudinal direction through the use of roll velocity difference at a temperature higher than the glass transition temperature, and then stretched in a transverse direction with a tenter, followed by heat treatment.

The film-forming conditions of the polyethylene terephthalate-based resin film are described in detail below. The temperature for stretching in the longitudinal direction and the temperature for stretching in the transverse direction are preferably 100 to 130° C., and particularly preferably 110 to 125° C.

When a film that has a slow axis in the film width direction (TD direction) is produced, the stretch ratio for stretching in the longitudinal direction is preferably 0.7 to 1.5, and particularly preferably 0.7 to 1.0. In order to suppress relaxation of amorphous molecular chains during stretching and increase the rigid amorphous fraction, the stretch ratio for stretching in the transverse direction is preferably high. The lower limit of the stretch ratio for stretching in the transverse direction is preferably 4.5, more preferably 4.7, and particularly preferably 5.0. However, if the stretch ratio for stretching in the transverse direction exceeds 7.0, the film easily tears in the transverse direction, resulting in decreased productivity. Thus, the upper limit of the stretch ratio for stretching in the transverse direction is preferably 7.0, more preferably 6.5, particularly preferably 6.0, and most preferably 5.5.

When a film that has a slow axis in the film longitudinal direction (MD direction) is produced, the stretch ratio for stretching in the transverse direction is preferably 1.0 to 3.0, and more preferably 2.0 to 3.0. In order to suppress relaxation of amorphous molecular chains during stretching and increase the rigid amorphous fraction, the stretch ratio for stretching in the longitudinal direction is preferably high. The lower limit of the stretch ratio for stretching in the longitudinal direction is preferably 4.5, more preferably 4.7, and particularly preferably 5.0. However, if the stretch ratio for stretching in the longitudinal direction exceeds 7.0, the film easily tears in the longitudinal direction, resulting in decreased productivity. Thus, the upper limit of the stretch ratio for stretching in the longitudinal direction is preferably 7.0, more preferably 6.5, and particularly preferably 6.0.

In order to control the retardation within the above range, it is preferable to control the proportion of longitudinal stretch ratio and transverse stretch ratio, the stretch temperature, and the film thickness. An overly small difference between the longitudinal and transverse stretch ratios is not preferred, because it is difficult to increase the retardation.

In order to suppress the orientation of benzene rings with respect to the film surface associated with crystallization during heat treatment, it is preferable to increase the rigid amorphous fraction. Specifically, it is necessary to suppress relaxation of amorphous molecular chains during stretching, and it is preferable to increase the strain rate during stretching of the film in the slow axis direction. The strain rate is preferably 13%/sec or more, more preferably 15%/sec or more, and particularly preferably 17%/sec or more. The upper limit is preferably 60%/sec, in terms of film-forming properties. The strain rate is expressed as (nominal strain (%) in stretching in the slow axis direction)/(time required in stretching in the slow axis direction (sec)). The nominal strain (%) is determined according to ((deformation amount (mm))/(initial length (mm)))×100.

In the subsequent heat treatment, the lower limit of the heat treatment temperature is preferably 150° C., more preferably 160° C., particularly preferably 170° C., and most preferably 180° C., in order to promote orientation crystallization and increase the retardation. The upper limit of the heat treatment temperature is preferably 220° C., more preferably 210° C., and particularly preferably 200° C., in order to prevent the crystallization of the rigid amorphous region and reduce the degree of orientation of the crystal (100) plane with respect to the film surface.

In the polyethylene terephthalate-based resin that forms the polyethylene terephthalate-based resin film, it is preferable that 85 mol % or more of the monomer units are ethylene terephthalate. The proportion of ethylene terephthalate units is preferably 90 mol % or more, and more preferably 95 mol % or more. Known acid components and glycol components may also be used as copolymerization components. The polyethylene terephthalate-based resin is particularly preferably polyethylene terephthalate, which is a homopolymer.

These resins have excellent transparency and also have excellent thermal and mechanical properties. This makes it possible to easily control the retardation by stretching. Polyethylene terephthalate is the most suitable material because it has high intrinsic birefringence, and therefore can relatively easily provide great retardation even if the thickness of the film is small.

Moreover, in order to prevent degradation of the optical functional dye, such as iodine dye, the protective film of the present invention preferably has a light transmittance at a wavelength of 380 nm of 20% or less. The light transmittance at 380 nm is more preferably 15% or less, even more preferably 10% or less, and particularly preferably 5% or less. When the above light transmittance is 20% or less, the degradation of the optical functional dye caused by ultraviolet light can be suppressed. In addition, the transmittance in the present invention is measured vertically with respect to the plane of the film, and can be measured with a spectrophotometer (e.g., Hitachi U-3500 spectrophotometer).

In order to adjust the transmittance of the protective film of the present invention at a wavelength of 380 nm to 20% or less, it is preferable to suitably control the type and concentration of an ultraviolet absorber and the thickness of the film. The ultraviolet absorber used in the present invention is a known substance. Examples of the ultraviolet absorber include organic ultraviolet absorbers and inorganic ultraviolet absorbers; however, organic ultraviolet absorbers are preferred in terms of transparency. Specific examples of organic ultraviolet absorbers include benzotriazole-based ultraviolet absorbers, benzophenone-based ultraviolet absorbers, cyclic imino ester-based ultraviolet absorbers, and a combination thereof; however, the organic ultraviolet absorbers are not particularly limited as long as they have an absorbance within the range specified in the present invention. Benzotriazole-based ultraviolet absorbers and cyclic imino ester-based ultraviolet absorbers are particularly preferred in terms of durability. When two or more ultraviolet absorbers are used in combination, ultraviolet lights of different wavelengths can be absorbed at the same time. Thus, the ultraviolet absorption effect can be further improved.

Examples of benzophenone-based ultraviolet absorbers, benzotriazole-based ultraviolet absorbers, and acrylonitrile-based ultraviolet absorbers include 2-[2'-hydroxy-5'-(methacryloyloxymethyl)phenyl]-2H-benzotriazole, 2-[2'-hydroxy-5'-methacryloyloxyethyl)phenyl]-2H-benzotriazole, 2-[2'-hydroxy-5'-(methacryloyloxypropyl)phenyl]-2H-benzotriazole, 2,2'-dihydroxy-4,4'-dimethoxybenzophenone, 2,2',4,4'-tetrahydroxybenzophenone, 2,4-di-tert-butyl-6-(5-chlorobenzotriazol-2-yl)phenol, 2-(2'-hydroxy-3'-tert-butyl-5'-methylphenyl)-5-chlorobenzotriazole, 2-(5-chloro(2H)-benzotriazol-2-yl)-4-methyl-6-(tert-butyl)phenol, 2,2'-methylenebis(4-(1,1,3,3-tetramethylbutyl)-6-(2H-benzotriazol-2-yl)phenol), and the like. Examples of cyclic imino ester-based ultraviolet absorbers include 2,2'-(1,4-phenylene)bis(4H-3,1-benzoxazin-4-one), 2-methyl-3,1-benzoxazin-4-one, 2-butyl-3,1-benzoxazin-4-one, 2-phenyl-3,1-benzoxazin-4-one, and the like. However, ultraviolet absorbers are not limited to these examples.

In another preferred embodiment, in addition to the ultraviolet absorber, various additives other than catalysts are added in the range in which the effect of the present invention is not impaired. Examples of such additives include inorganic particles, heat-resistant polymer particles, alkali metal compounds, alkaline earth metal compounds, phosphorus compounds, antistatic agents, light-resistant agents, flame retardants, heat stabilizers, antioxidants, anti-gelling agents, surfactants, and the like. Moreover, in order to achieve high transparency, it is also preferable that the polyethylene terephthalate-based resin film does not substantially contain particles. "Not substantially contain particles" means that, for example, in the case of inorganic particles, the content of inorganic elements quantified by X-ray fluorescence analysis is 50 ppm or less, preferably 10 ppm or less, and particularly preferably not greater than the detection limit.

Moreover, as the method of mixing an ultraviolet absorber with the polyethylene terephthalate-based resin film of the present invention, known methods can be used in combination. For example, a masterbatch is produced beforehand by mixing a dried ultraviolet absorber with polymer raw materials using a kneading extruder, and the masterbatch and the polymer raw materials are mixed during the film production.

In that case, the ultraviolet absorber concentration in the masterbatch is preferably 5 to 30 mass % so as to uniformly disperse and economically mix the ultraviolet absorber. Preferred conditions for producing the masterbatch include use of a kneading extruder, and extrusion at a temperature equal to or greater than the melting point of the polyethylene terephthalate-based raw material and equal to or lower than 290° C. for 1 to 15 minutes. At a temperature of 290° C. or more, a large amount of ultraviolet absorber is lost, and the viscosity of the masterbatch is significantly reduced. For an extrusion time of 1 minute or less, it is difficult to homogeneously mix the ultraviolet absorber. At this point, a stabilizer, a color tone-controlling agent, and an antistatic agent may be added, if necessary.

Furthermore, in the present invention, it is preferable that the film has a multi-layered structure including at least three or more layers, and that an ultraviolet absorber is added to the intermediate layer(s) of the film. Such a three-layer film containing an ultraviolet absorber in the intermediate layer can be specifically produced in the following manner. Polyethylene terephthalate-based resin pellets are singly used for the outer layers. For the intermediate layer, polyethylene terephthalate-based resin pellets and a masterbatch containing an ultraviolet absorber are mixed in a predetermined proportion, and then dried. These are supplied into a known extruder for melt-lamination, and extruded through a slit-shaped die into a sheet-like shape, followed by cooling and solidification on a casting roll, thereby forming an unstretched film. More specifically, film layers constituting both outer layers and a film layer constituting the intermediate layer are laminated by using two or more extruders, a three-layer manifold, or a junction block (e.g., a junction block with a square-shaped junction). A three-layered sheet is extruded through a die and cooled on a casting roll, thereby forming an unstretched film. In the invention, in order to remove foreign substances, which cause optical defects, from the raw material (i.e., polyethylene terephthalate-based resin), it is preferable to perform high-precision filtration during melt extrusion. The filtration particle size (initial filtration efficiency: 95%) of a filtering medium used for high-precision filtration of the molten resin is preferably 15 μm or less. When the filtration particle size of the filtering medium is more than 15 μm, removal of foreign substances with a size of 20 μm or more is likely to be insufficient.

Furthermore, in order to enhance the adhesion of the polyethylene terephthalate-based resin film of the present invention to the polarizing film, the polyethylene terephthalate-based resin film can be subjected to corona treatment, coating treatment, flame treatment, or the like.

In the present invention, in order to improve the adhesion of the film of the present invention to the polarizing film, the film of the present invention preferably has, on at least one of its sides, an adhesion-facilitating layer comprising at least one of polyester resin, polyurethane resin, and polyacrylic resin as a main component. "Main component" as used herein refers to, among solid components that constitute the adhesion-facilitating layer, one with 50 mass % or more. The coating solution used to form the adhesion-facilitating layer of the present invention is preferably an aqueous coating solution comprising at least one of water-soluble or water-dispersible copolymerized polyester resin, acrylic resin, and polyurethane resin. Examples of such coating solutions include a water-soluble or water-dispersible copolymerized polyester resin solution, acrylic resin solution, polyurethane resin solution, etc., as disclosed in JP3567927B, JP3589232B, JP3589233B, JP3900191B, JP4150982B, etc.

The adhesion-facilitating layer can be obtained by applying the coating solution to one side or both sides of an unstretched film or a longitudinally uniaxially stretched film, followed by drying at 100 to 150° C., and further stretching the film in a transverse direction. The final amount of coating of the adhesion-facilitating layer is preferably maintained in the range of 0.05 to 0.20 g/m$^2$. When the amount of coating is less than 0.05 g/m$^2$, the resulting adhesion to the polarizing film may be insufficient. In contrast, when the amount of coating exceeds 0.20 g/m$^2$, blocking resistance may be reduced. When the adhesion-facilitating layer is provided on both sides of the polyethylene terephthalate-based resin film, the amounts of coating of the adhesion-facilitating layers on both sides may be the same or different, and can be independently set within the above range.

It is preferable to add particles to the adhesion-facilitating layer so as to impart lubricating properties. Fine particles with an average particle diameter of 2 μm or less are preferably used. Particles with an average particle diameter of more than 2 μm tend to easily drop out from the coating layer. Examples of the particles to be added to the adhesion-facilitating layer include inorganic particles of titanium oxide, barium sulfate, calcium carbonate, calcium sulfate, silica, alumina, talc, kaolin, clay, calcium phosphate, mica, hectorite, zirconia, tungsten oxide, lithium fluoride, calcium fluoride, or the like; and styrene, acrylic, melamine, benzoguanamine, silicone, and other organic polymer particles. These particles may be added singly or in a combination of two or more to the adhesion-facilitating layer.

Moreover, the method for applying the coating solution may be a known method. Examples include reverse-roll coating, gravure coating, kiss coating, roll-brush coating, spray coating, air-knife coating, wire-bar coating, pipe doctor methods, and the like. These methods can be used singly or in combination.

The average particle diameter of the above particles is measured in the following manner. Images of the particles are taken with a scanning electron microscope (SEM). The maximum diameter of 300 to 500 individual particles (distance between the two most separated points) is measured at such a magnification that the size of the smallest single particle is 2 to 5 mm. The average of the maximum diameter of the particles is regarded as the average particle diameter.

The polyethylene terephthalate-based resin film of the present invention may have any thickness and preferably has a thickness in the range of 30 to 300 μm, and more preferably 40 to 200 μm. Even a film with a thickness of lower than 30 μm can, in principle, provide a retardation of 3000 nm or more. In this case, however, the mechanical properties of the film become significantly anisotropic. This causes the film to, for example, tear or break, which significantly reduces the practicality of the film as an industrial material. The lower limit of the thickness is particularly preferably 45 μm. However, if the upper limit of the thickness of the protective film exceeds 300 μm, the polarizer is too thick, which is not preferred. The upper limit of the thickness is preferably 120 μm, more preferably 100 μm or less, even more preferably 80 μm or less, still even more preferably 65 μm or less, further more preferably 60 μm or less, and further even more preferably 55 μm or less, in terms of practicality as a protective film. In general, the thickness of the protective film is preferably in the range of 30 to 65 μm from the viewpoint of making the film thinner.

In order to suppress variation of the retardation, the thickness variation of the film is preferably low. Since the stretch temperature and the stretch ratios have a great effect on the film thickness variation, it is necessary to optimize the film-forming conditions in terms of the thickness variation. In particular, when the longitudinal stretch ratio is reduced to increase retardation, the longitudinal thickness variation may deteriorate. Since there is an area in which the longitudinal thickness variation significantly deteriorates in a specific range of the stretch ratio, it is preferable to determine the film-forming conditions outside that range.

The film of the present invention preferably has a thickness variation of 5.0% or less, more preferably 4.5% or less, even more preferably 4.0% or less, and particularly preferably 3.0% or less.

In the polyethylene terephthalate-based resin film used for the protective film, the Nz factor expressed as |ny−nz|/|ny−nx| is preferably 1.7 or less. The Nz factor can be determined in the following manner. The orientation axis direction of the film is determined with a molecular orientation analyzer (MOA-6004, produced by Oji Scientific Instruments), and the refractive indices (ny and nx; ny>nx) in two directions; i.e., the orientation axis direction and a direction orthogonal to the orientation axis direction, and the refractive index (nz) in the thickness direction, are determined with an Abbe refractometer (NAR-4T produced by Atago Co., Ltd.; measurement wavelength: 589 nm). The Nz factor can be determined by substituting nx, ny, and nz obtained in this manner into the equation represented by ny−nz|/|ny−nx|. The Nz factor is more preferably 1.65 or less, and even more preferably 1.63 or less. The lower limit of the Nz factor is 1.2. In order to maintain the mechanical strength of the film, the lower limit of the Nz factor is preferably 1.3 or more, more preferably 1.4 or more, and even more preferably 1.45 or more.

The polyethylene terephthalate-based resin film preferably has a ratio (Re/Rth) of retardation (Re) to thickness-direction retardation (Rth) of 0.2 or more, more preferably 0.5 or more, and even more preferably 0.6 or more. It is preferable that the ratio (Re/Rth) is greater. The upper limit is preferably 2.0 or less, and more preferably 1.8 or less. The thickness-direction retardation is a parameter indicating the average of retardation obtained by multiplying two birefringence values $\Delta Nxz$ ($=|nx-nz|$) and $\Delta Nyz$ ($=|ny-nz|$) when viewed from a film-thickness direction cross-section by a film thickness d. The thickness-direction retardation (Rth) can be determined by determining refractive indices nx, ny, and nz, and the film thickness d (nm), and calculating the average value of ($\Delta Nxz \times d$) and ($\Delta Nyz \times d$). Refractive indices nx, ny, and nz are determined with an Abbe refractometer (NAR-4T produced by Atago Co., Ltd.; measurement wavelength: 589 nm).

2. Polarizer

The polarizer of the present invention has a structure in which a protective film is bonded to at least one surface of a polarizing film prepared by dyeing polyvinyl alcohol (PVA) etc. with iodine. Either of the protective films is preferably the protective film of the present invention. The other protective film is preferably a birefringence-free film, typified by TAC films, acrylic films, and norbornene films. The other protective film does not necessarily need to be present. In another preferred embodiment, the surface of the polarizer used in the present invention is coated with various hard coatings so as to prevent background reflections, glare, scratches, and so on.

3. Liquid Crystal Display Device

In general, a liquid crystal panel comprises a back module, a liquid crystal cell, and a front module in this order, starting from the side opposing a backlight light source to the side on which an image is displayed (i.e., the viewing side). The back module and the front module each ordinarily include a transparent substrate, a transparent conductive film formed on the surface of the transparent substrate on the liquid crystal cell side, and a polarizer disposed on the opposite side. In this regard, the polarizer in the back module is disposed on the side opposing the backlight light source, and the polarizer in the front module is disposed on the side on which an image is displayed (i.e., the viewing side).

The liquid crystal display device of the present invention comprises, as components, at least a backlight light source, and a liquid crystal cell disposed between two polarizers. Furthermore, the liquid crystal display device may appropriately comprise, in addition to the above components, other components, such as a color filter, a lens film, an optical diffusion sheet, and an antireflection film. At least one of the two polarizers is preferably the polarizer of the present invention.

The structure of the backlight may be an edge-light system comprising a light guide plate, a reflector, etc., as components, or a direct under-light system.

Any backlight light source can be used without particular limitation as the backlight light source in the liquid crystal display device of the present invention. Of these, white-light-emitting diodes with an emission spectrum that have one or more peak tops in each of the wavelength regions of 400 nm or more and less than 495 nm, 495 nm or more and less than 600 nm, and 600 nm or more and 780 nm or less and in which the half widths of the peaks in the red region are relatively narrow (the half width of the most intense peak being, for example, less than nm) (e.g., white-light-emitting diodes comprising blue-light-emitting diodes and at least a fluoride phosphor that is $K_2SiF_6:Mn^{4+}$ (also called "KSF") as a phosphor) are preferable. Even with the backlight light source of such a liquid crystal display device, which achieves a wide color gamut, the occurrence of rainbow unevenness can be suppressed by the protective film of the present invention.

As the backlight light source in the liquid crystal display device of the present invention, a white light source with one or more peak tops in an emission spectrum in each of the wavelength regions of 400 nm or more and less than 495 nm, 495 nm or more and less than 600 nm, and 600 nm or more and 780 nm or less can also be preferably used. Examples of such light sources include white light sources using quantum dot technology, phosphor-based white LED light sources that use phosphors with emission peaks in the R (red) and G (green) regions due to excitation light and blue LEDs, three-wavelength white LED light sources, white LED light sources combined with a red laser, and the like.

Phosphor-based white LEDs obtained by combining light-emitting diodes using compound semiconductors to emit blue light or ultraviolet light with phosphors (e.g., yttrium-aluminum-garnet yellow phosphors or terbium-aluminum-garnet yellow phosphors), which are conventionally used, can also be preferably used.

The position of the protective film of the present invention, which has the specific retardation, in the liquid crystal display device is not particularly limited. In the case of a liquid crystal display device comprising a polarizer disposed on the light-incoming side (light source side), a liquid crystal cell, and a polarizer on the light-outgoing side (viewing side), it is preferable that the protective film on the light-incoming side of the polarizing film of the polarizer disposed on the light-incoming side, and/or the protective film on the light-outgoing side of the polarizing film of the polarizer disposed on the light-outgoing side is a protective film comprising a polyethylene terephthalate-based resin film having the specific retardation. In a particularly preferred embodiment, the protective film on the light-outgoing side of the polarizing film of the polarizer disposed on the light-outgoing side is a polyethylene terephthalate-based resin film having the specific retardation. If the polyethylene terephthalate-based resin film is disposed in a position other than the positions described above, the polarization properties of the liquid crystal cell may be changed. Since it is not preferable to use the polymer film of the present invention in a place for which polarization properties are required, the polymer film of the present invention is preferably used as the protective film of the polarizer in such a specific position.

The screen size of the liquid crystal display device of the present invention is not particularly limited and is preferably 32 inches or more.

EXAMPLES

The present invention is described below in more detail with reference to Examples; however, the present invention is not limited to these Examples. The present invention can be put into practice after appropriate modifications or variations within a range meeting the gist of the present invention, all of which are included in the technical scope of the present invention. In the following Examples, the methods for the evaluation of physical properties are as follows.

(1) Retardation (Re)

Retardation is a parameter defined by the product ($\Delta Nxy \times d$) of the anisotropy ($\Delta Nxy=|nx-ny|$) of the refractive indices in two mutually orthogonal directions on a film and the film thickness d (nm), and is a scale indicating optical isotropy or anisotropy. The anisotropy ($\Delta Nxy$) of refractive indices in two directions is obtained by the following method. The slow axis direction of a film was determined with a molecular orientation analyzer (MOA-6004 produced by Oji Scientific Instruments), and the film was cut into a 4 cm×2 cm rectangular sample so that the slow axis direction was parallel to the long side of the sample for measurement. The sample was measured for the refractive indices in two mutually orthogonal directions (refractive index in the slow axis direction: ny; refractive index in a direction orthogonal to the slow axis direction: nx) and the refractive index (nz) in the thickness direction by using an Abbe refractometer (NAR-4T produced by Atago Co., Ltd.; measurement wavelength: 589 nm). Then, the absolute value ($|nx-ny|$) of the difference between the refractive indices in the two directions was defined as the anisotropy ($\Delta Nxy$) of the refractive indices. The film thickness d (nm) was measured using an electric micrometer (Millitron 1245D produced by Feinpruf GmbH), and was converted into nm units. Retardation (Re) was determined by the product ($\Delta Nxy \times d$) of the anisotropy ($\Delta Nxy$) of the refractive indices and the film thickness d (nm).

(2) CTF Value of Periodic Unevenness of X Value of Chromaticity

The CTF value of periodic unevenness of the x value of chromaticity is expressed by equation (1) described above and can be measured with an imaging color luminance meter (produced by Radiant, a device in which a Conoscope PM-CO-060 is connected to a ProMetric IC-PMI16). The details of the measurement method are described below.

Bonding of Sample to Liquid Crystal Display Device

Figure 1:
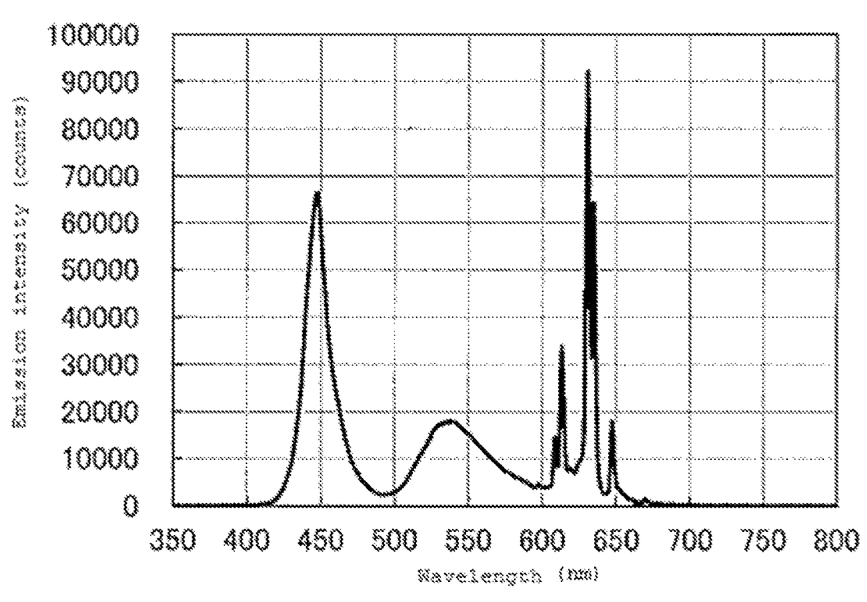
FIG. 1 is an emission spectrum of a backlight light source of a liquid crystal display device used for measurement of the CTF value of periodic unevenness of the x value of chromaticity and evaluation of rainbow unevenness.

A Toshiba REGZA 43J10X (produced in 2014) was used as a commercially available liquid crystal display device comprising as a backlight light source a white-light-emitting diode that has one or more peak tops in an emission spectrum in each of the wavelength regions of 400 nm or more and less than 495 nm, 495 nm or more and less than 600 nm, and 600 nm or more and 780 nm or less and comprises $K_2SiF_6:Mn^{4+}$ as a phosphor. An emission spectrum of the backlight light source of the liquid crystal display device was measured with an exposure time of 20 msec using a PMA-12 photonic multichannel analyzer produced by Hamamatsu Photonics K.K. As shown in FIG. 1, the observed emission spectrum had peak tops around 448 nm, 533 nm, and 630 nm, and the half width of each peak top was 2 nm to 49 nm. The liquid crystal display device had a reflective polarizer between the light-source-side protective film of the light-source-side polarizer and the backlight light source, and the reflective polarizer was disposed so that its absorption axis was parallel to the absorption axis of the light-source-side polarizer.

The polyethylene terephthalate-based resin film produced in each Example was cut into an A4 size whose longitudinal direction was the fast axis direction, and bonded to the light source side of the light-source-side protective film of the light-source-side polarizer of the liquid crystal display device. In doing so, the polyethylene terephthalate-based film was bonded so that the fast axis direction of the polyethylene terephthalate-based film coincided with the absorption axis direction of the polarizing film in the light-source-side polarizer and so that the center (the point of intersection of the diagonal lines) of the light-source-side polarizer coincided with the center (the point of intersection of the diagonal lines) of the polyethylene terephthalate-based film. The light-source-side protective film and the polyethylene terephthalate-based film were bonded to each other with tap water, and a paper towel (Kimtowel, white, folded in four, produced by Nippon Paper Crecia Co., Ltd.) was used to remove air bubbles and wipe off excess water.

Measurement and Calculation of CTF Value

The liquid crystal display device was placed in a dark compartment so that the display normal direction was parallel to the floor surface, and a white screen was displayed after making various settings to the factory settings. The white screen was displayed by inputting a bitmap image (R=255, G=255, and B=255 in Adobe RGB color space; size: 5000 pixels (height)×3125 pixels (width)) through a USB terminal. Subsequently, an imaging color luminance meter (produced by Radiant, a device in which a Conoscope PM-CO-060 is connected to a ProMetric IC-PMI16) was placed so that the light-receiving part faced the display side of the liquid crystal display device, and adjustment was made so that the central axis of the optical system in the imaging color luminance meter coincided with the normal extending from the center (the point of intersection of the diagonal lines) of the display and so that the distance between the tip of the measuring lens and the surface of the display was 3 un. Thereafter, the profile X (θ) (105≤θ≤170) of periodic unevenness of the x value of chromaticity of the emitted light with respect to the azimuthal angle θ (degrees) was measured. Specifically, from the "Define Points of Interest" menu, the device was set to extract the x value of chromaticity at 1-degree intervals from 105 to 170 degrees (θ) at 55 degrees (φ). In performing measurement, measurement using the Y, X and Z filters was set as a measurement target in the capture settings, the exposure adjustment was set to automatic, and no ND filters were used. In addition, the conoscope plot type was set to type C in the measurement settings. For the obtained X (θ), the extrema (local maximum(s) and local minimum(s)) $X_k$ (1≤k≤N−1; N≥2; N being the total number of extrema) of the profile were extracted as $X_1, X_2, \ldots$ in ascending order of θ, and the CTF value was calculated according to equation (1) described above. When the same measurement was performed using only the liquid crystal display device without the polyethylene terephthalate-based film being bonded to the device, no periodic unevenness of the x value of chromaticity was observed, confirming that only periodic unevenness of the x value of chromaticity due to the polyethylene terephthalate-based film produced in each Example was appropriately evaluated.

(3) Rigid Amorphous Fraction

The rigid amorphous fraction is expressed by equation (2) described above and is calculated indirectly from the values of the mobile amorphous fraction and the mass fraction crystallinity.

The mobile amorphous fraction is a parameter defined as ((ΔCp in a sample)/(ΔCp in a fully amorphous state))×100 (wt %) from the reversing heat capacity difference ΔCp (J/(g·K)) at Tg of a reversing heat capacity curve obtained by temperature-modulated DSC measurement using a differential scanning calorimeter (Q100 produced by TA Instruments). In the case of polyethylene terephthalate, ΔCp in a fully amorphous state=0.4052 (J/(g·K)). 2.0±0.2 mg of a sample was weighed into an aluminum pan and measured under the conditions of the MDSC (registered trademark) modulated heat-only mode, an average temperature ramp rate of 5.0° C./min, and a modulation period of 60 sec. The measurement data were collected at a sampling frequency of 5 Hz. Indium was used for calibration of the temperature and heat quantity, and sapphire was used for calibration of the specific heat.

The calculation method for Tg and ΔCp is described below. First, the first derivative F'(T) of temperature T of a reversing heat capacity curve F(T) was plotted and smoothed by taking the moving average of every 2401 points, and Tg was determined by reading the value of the temperature at the peak top. Next, a straight line G(T) passing through two points A (Tg−15, F(Tg−15)) and B (Tg+15, F(Tg+15)) was determined. Subsequently, the temperature at which F(T)-G(T) became minimal in the range of Tg−15 T Tg+15 was defined as T1, and the temperature at which F(T)-G(T) became maximum in the range of Tg−15≤T≤Tg+15 was defined as T2. Since T1 corresponds to the glass transition onset temperature, and T2 corresponds to the glass transition end temperature, the value of ΔCp was obtained by ΔCp=F(T2)−F(T1).

The mass fraction crystallinity X was calculated according to the following equation using the density value d (g/cm$^3$) obtained by using a water/calcium nitrate density gradient tube according to JIS K7112.

$$X=(dc/d)\times((d-da)/(d-dc))\times100(\text{wt \%})$$

dc: the density of a fully crystalline state, da: the density of a fully amorphous state In the case of polyethylene terephthalate, dc=1.498 (g/cm$^3$), and da=1.335 (g/cm$^3$)).

(4) Observation of Rainbow Unevenness

A polyethylene terephthalate film produced by the method described below was bonded to one side of a polarizing film comprising PVA and iodine so that the absorption axis of the polarizing film was vertical to the main orientation axis of the polyethylene terephthalate film, and a commercially available TAC film was bonded to the opposite side of the polarizing film, thereby obtaining a polarizer. The polarizer on the light-outgoing side that was originally present in a commercially available liquid crystal display device (REGZA 43J10X produced by Toshiba Corporation) was replaced with the polarizer obtained above so that the absorption axis of the polarizer obtained above coincided with the absorption axis direction of the polarizer originally attached to the liquid crystal display device and so that the polyethylene terephthalate film was on the viewing side. The liquid crystal display device has a backlight light source that comprises a light source for emitting excitation light and a $K_2SiF_6$:$Mn^{4+}$ phosphor. An emission spectrum of the backlight light source of the liquid crystal display device was measured with a PMA-12 photonic multichannel analyzer produced by Hamamatsu Photonics K.K. As shown in FIG. 1, the observed emission spectrum had peak tops around 448 nm, 533 nm, and 630 nm. The half width of each peak top was 2 nm to 49 nm. Multiple peaks were observed around 630 nm, and the half width of the peak with the highest emission intensity among the peaks was 3 nm. The exposure time for spectrum measurement was 20 msec.

A white image was displayed on the liquid crystal display device prepared in the above manner. The display was visually observed from the front direction and an oblique direction, and the occurrence of rainbow unevenness was determined as follows. The observation angle was defined as the angle between a line extending from the center of the screen of the display in the normal (perpendicular) direction and a line connecting the center of the display and the position of the eye during observation.

A: No rainbow unevenness observed in the observation angle range of 0 to 60 degrees.

B: Partial, light rainbow unevenness observed in the observation angle range of 0 to 60 degrees.

C: Clear rainbow unevenness observed in the observation angle range of 0 to 60 degrees.

Production Example 1: Polyester A

The temperature of an esterification reaction vessel was raised, and when the temperature reached 200° C., 86.4 parts by mass of terephthalic acid and 64.6 parts by mass of ethylene glycol were put in the vessel. While stirring the mixture, 0.017 parts by mass of antimony trioxide, 0.064 parts by mass of magnesium acetate tetrahydrate, and 0.16 parts by mass of triethylamine were added as catalysts. Subsequently, the pressure and temperature were raised, and pressure esterification was performed at a gauge pressure of 0.34 MPa at 240° C. Then, the pressure in the esterification reaction vessel was returned to normal pressure, and 0.014 parts by mass of phosphoric acid was added. Further, the temperature was raised to 260° C. over 15 minutes, and 0.012 parts by mass of trimethyl phosphate was added. Subsequently, after 15 minutes, dispersion was performed with a high-pressure disperser. After 15 minutes, the obtained esterification reaction product was transferred to a polycondensation reaction vessel, and a polycondensation reaction was performed at 280° C. under reduced pressure.

After completion of the polycondensation reaction, filtration was performed using a Naslon filter (95% cut size: 5 μm). The resultant was extruded through a nozzle into a strand shape, cooled and solidified with cooling water, which had been filtered beforehand (pore size: 1 μm or less), and cut into pellets. The obtained polyethylene terephthalate resin (A) had an intrinsic viscosity of 0.62 dl/g and did not substantially contain inert particles and internally deposited particles (hereafter abbreviated as "PET (A)").

Production Example 2: Polyester B parts by mass of a dried ultraviolet absorber (2,2'-(1,4-phenylene)bis(4H-3,1-benzoxazin-4-one) and 90 parts by mass of particle-free PET (A) (intrinsic viscosity: 0.62 dl/g) were mixed, and a kneading extruder was used to obtain a polyethylene terephthalate resin (B) containing the ultraviolet absorber (hereafter abbreviated as "PET (B)").

Production Example 3: Preparation of Adhesion-Modified Coating Solution

A transesterification reaction and a polycondensation reaction were performed in a standard manner to prepare a water-dispersible sulfonic acid metal salt group-containing copolymerized polyester resin comprising, as dicarboxylic acid components (based on the entire dicarboxylic acid components), 46 mol % of terephthalic acid, 46 mol % of isophthalic acid, and 8 mol % of sodium 5-sulfonatoisophthalate; and as glycol components (based on the entire glycol components), 50 mol % of ethylene glycol and 50 mol % of neopentyl glycol. Subsequently, 51.4 parts by mass of water, 38 parts by mass of isopropyl alcohol, 5 parts by mass of n-butyl cellosolve, and 0.06 parts by mass of nonionic surfactant were mixed, and then stirred under heating. When the temperature reached 77° C., 5 parts by mass of the above water-dispersible sulfonic acid metal salt group-containing copolymerized polyester resin was added, and continuously stirred until the mass of the resin disappeared. Thereafter, the resulting resin aqueous dispersion was cooled to room temperature, thereby obtaining a homogeneous water-dispersible copolymerized polyester resin solution with a solids content of 5.0 mass %. Furthermore, 3 parts by mass of aggregate silica particles (Sylysia 310, produced by Fuji Silysia Chemical Ltd.) was dispersed in 50 parts by mass of water. Then, 0.54 parts by mass of the water dispersion of Sylysia 310 was added to 99.46 parts by mass of the above water-dispersible copolymerized polyester resin solution. While stirring the mixture, 20 parts by mass of water was added, thereby obtaining an adhesion-modified coating solution.

Example 1

As the starting materials for the base film intermediate layer, 90 parts by mass of particle-free PET (A) resin pellets and 10 parts by mass of ultraviolet absorber-containing PET (B) resin pellets were dried under reduced pressure (1 Torr) at 135° C. for 6 hours, and then supplied to an extruder 2 (for the intermediate layer II). Further, PET (A) was dried by a standard method, supplied to extruders 1 (each for the outer layer I and the outer layer III), and melted at 285° C. These two polymers were each filtered through a filtering medium of a stainless steel sintered body (nominal filtering accuracy: 10 μm-particle 95% cut), laminated by two types of three-layered junction blocks, and extruded through a die into a sheet-like shape. The resulting sheet was cooled and solidified by winding the sheet around a casting drum with a surface temperature of 30° C. by an electrostatic casting method, thereby forming an unstretched film. At this time, the discharge of each extruder was adjusted so that the thickness ratio of layer I, layer II, and layer III was 10:80:10.

Then, the adhesion-modified coating solution prepared above was applied to both sides of the unstretched PET film by reverse-roll coating so that the amount of dried coating was 0.08 g/m², followed by drying at 80° C. for 20 seconds.

The unstretched film, on which a coating layer had been formed, was guided to a tenter stretching machine. While the edges of the film were held with clips, the film was guided to a hot-air zone with a temperature of 130° C., and stretched at a strain rate of 13.8%/sec so as to be stretched 5.5 times in the width direction. Subsequently, while the width of the film stretched in the width direction was maintained, the film was heat-treated in a hot-air zone with a temperature of 180° C., and further subjected to 3% relaxation treatment in the width direction. Thus, a uniaxially oriented PET film with a thickness of about 60 µm was obtained.

Example 2

An unstretched film prepared in the same manner as in Example 1 was guided to a tenter stretching machine. While the edges of the film were held with clips, the film was guided to a hot-air zone with a temperature of 120° C., and stretched at a strain rate of 18.3%/sec so as to be stretched 5.5 times in the width direction. Subsequently, while the width of the film stretched in the width direction was maintained, the film was heat-treated in a hot-air zone with a temperature of 180° C., and further subjected to 3% relaxation treatment in the width direction. Thus, a uniaxially oriented PET film with a thickness of about 60 µm was obtained.

Example 3

An unstretched film prepared in the same manner as in Example 1 was guided to a tenter stretching machine. While the edges of the film were held with clips, the film was guided to a hot-air zone with a temperature of 118° C. and stretched at a strain rate of 34.6%/sec so as to be stretched 5.0 times in the width direction. Subsequently, while the width of the film stretched in the width direction was maintained, the film was heat-treated in a hot-air zone with a temperature of 180° C. and further subjected to 3% relaxation treatment in the width direction. Thus, a uniaxially oriented PET film with a thickness of about 60 µm was obtained.

Example 4

An unstretched film prepared in the same manner as in Example 1 was guided to a tenter stretching machine. While the edges of the film were held with clips, the film was guided to a hot-air zone with a temperature of 107° C. and stretched at a strain rate of 34.6%/sec so as to be stretched 5.0 times in the width direction. Subsequently, while the width of the film stretched in the width direction was maintained, the film was heat-treated in a hot-air zone with a temperature of 180° C. and further subjected to 3% relaxation treatment in the width direction. Thus, a uniaxially oriented PET film with a thickness of about 60 µm was obtained.

Example 5

An unstretched film prepared in the same manner as in Example 1 except that the thickness was changed, was guided to a tenter stretching machine. While the edges of the film were held with clips, the film was guided to a hot-air zone with a temperature of 125° C. and stretched at a strain rate of 18.3%/sec so as to be stretched 5.5 times in the width direction. Subsequently, while the width of the film stretched in the width direction was maintained, the film was heat-treated in a hot-air zone with a temperature of 180° C., and further subjected to 3% relaxation treatment in the width direction. Thus, a uniaxially oriented PET film with a thickness of about 50 µm was obtained.

Example 6

An unstretched film prepared in the same manner as in Example 1 was guided to a tenter stretching machine. While the edges of the film were held with clips, the film was guided to a hot-air zone with a temperature of 130° C. and stretched at a strain rate of 13.8%/sec so as to be stretched 5.5 times in the width direction. Subsequently, while the width of the film stretched in the width direction was maintained, the film was heat-treated in a hot-air zone with a temperature of 200° C., and further subjected to 3% relaxation treatment in the width direction. Thus, a uniaxially oriented PET film with a thickness of about 60 µm was obtained.

Example 7

An unstretched film prepared in the same manner as in Example 1 was guided to a tenter stretching machine. While the edges of the film were held with clips, the film was guided to a hot-air zone with a temperature of 120° C. and stretched at a strain rate of 20.8%/sec so as to be stretched 6.0 times in the width direction. Subsequently, while the width of the film stretched in the width direction was maintained, the film was heat-treated in a hot-air zone with a temperature of 180° C., and further subjected to 3% relaxation treatment in the width direction. Thus, a uniaxially oriented PET film with a thickness of about 50 µm was obtained.

Comparative Example 1

An unstretched film prepared in the same manner as in Example 1 was guided to a tenter stretching machine. While the edges of the film were held with clips, the film was guided to a hot-air zone with a temperature of 90° C. and stretched at a strain rate of 12.5%/sec so as to be stretched 4.0 times in the width direction. Subsequently, while the width of the film stretched in the width direction was maintained, the film was heat-treated in a hot-air zone with a temperature of 180° C., and further subjected to 3% relaxation treatment in the width direction. Thus, a uniaxially oriented PET film with a thickness of about 60 µm was obtained.

Comparative Example 2

An unstretched film prepared in the same manner as in Example 1 was guided to a tenter stretching machine. While the edges of the film were held with clips, the film was guided to a hot-air zone with a temperature of 130° C. and stretched at a strain rate of 13.8%/sec so as to be stretched 5.5 times in the width direction. Subsequently, while the width of the film stretched in the width direction was maintained, the film was heat-treated in a hot-air zone with a temperature of 240° C., and further subjected to 3% relaxation treatment in the width direction. Thus, a uniaxially oriented PET film with a thickness of about 60 µm was obtained.

Table 1 shows the measurement results of the PET films obtained in the Examples and Comparative Examples.

TABLE 1

| | Thickness (μm) | Width-direction stretch ratio | Strain rate (%/sec) | Retardation (nm) | CTF value | Rigid amorphous fraction (wt %) | Mobile amorphous fraction (wt %) | Mass fraction crystallinity (wt %) | ΔNxy | Rainbow unevenness |
|---|---|---|---|---|---|---|---|---|---|---|
| Example 1 | 60 | 5.5 | 13.8 | 7482 | 0.61 | 35.3 | 31.7 | 33.0 | 0.125 | B |
| Example 2 | 60 | 5.5 | 18.3 | 7944 | 0.56 | 41.2 | 25.2 | 33.6 | 0.132 | A |
| Example 3 | 60 | 5.0 | 34.6 | 6396 | 0.80 | 36.7 | 29.9 | 33.4 | 0.107 | B |
| Example 4 | 60 | 5.0 | 34.6 | 7146 | 0.92 | 40.6 | 26.7 | 32.7 | 0.119 | B |
| Example 5 | 50 | 5.5 | 18.3 | 5525 | 1.11 | 38.7 | 30.1 | 31.2 | 0.111 | B |
| Example 6 | 60 | 5.5 | 13.8 | 7422 | 0.71 | 33.6 | 30.1 | 36.2 | 0.124 | B |
| Example 7 | 50 | 6.0 | 20.8 | 6315 | 0.66 | 42.7 | 25.5 | 31.8 | 0.126 | B |
| Comparative Example 1 | 60 | 4.0 | 12.5 | 6444 | 1.69 | 30.1 | 36.7 | 33.2 | 0.107 | C |
| Comparative Example 2 | 60 | 5.5 | 13.8 | 7365 | 1.25 | 31.2 | 30.0 | 38.9 | 0.123 | C |

INDUSTRIAL APPLICABILITY

The liquid crystal display device, polarizer, and protective film of the present invention enable suppression of rainbow unevenness even when the backlight light source exhibits various emission spectra due to the wider color gamut of liquid crystal display devices.

The invention claimed is:

1. A protective film comprising a polyethylene terephthalate-based resin film, the polyethylene terephthalate-based resin film satisfying the following (1)-(3):
   (1) the polyethylene terephthalate-based resin film has an in-plane retardation of 3000 to 30000 nm;
   (2) a contrast transfer function (CTF) value of periodic unevenness of an x value of chromaticity at an observation angle of 55 degrees is 1.2 or less when the polyethylene terephthalate-based resin film is bonded to the light source side of a light-source-side protective film of a light-source-side polarizer in a liquid crystal display device comprising as a backlight light source a white-light-emitting diode that has one or more peak tops in an emission spectrum in each of wavelength regions of 400 nm or more and less than 495 nm, 495 nm or more and less than 600 nm, and 600 nm or more and 780 nm or less and comprises $K_2SiF_6:Mn^{4+}$ as a phosphor; and
   (3) the polyethylene terephthalate-based resin film has a rigid amorphous fraction of 33 wt % or more.

2. A polarizer comprising a polarizing film and the protective film according to claim 1 laminated on at least one surface of the polarizing film.

3. A liquid crystal display device comprising a backlight light source, two polarizers, and a liquid crystal cell disposed between the two polarizers, at least one of the two polarizers being the polarizer according to claim 2.

* * * * *